(12) United States Patent
Leclair

(10) Patent No.: US 7,441,788 B2
(45) Date of Patent: Oct. 28, 2008

(54) FRONT DRIVE GEOMETRY FOR AN ALL-TERRAIN VEHICLE

(75) Inventor: Alexandre Leclair, Sherbrooke (CA)

(73) Assignee: Bombardier Recreational Products Inc., Valcourt (CA)

( * ) Notice: Subject to any disclaimer, the term of this patent is extended or adjusted under 35 U.S.C. 154(b) by 548 days.

(21) Appl. No.: 11/168,505

(22) Filed: Jun. 29, 2005

(65) Prior Publication Data

US 2006/0006623 A1    Jan. 12, 2006

Related U.S. Application Data

(60) Provisional application No. 60/586,217, filed on Jul. 9, 2004.

(51) Int. Cl.
*B62D 7/18* (2006.01)
*B60G 3/04* (2006.01)
*B60G 3/18* (2006.01)
*F16D 65/12* (2006.01)

(52) U.S. Cl. .......................... 280/93.512; 280/124.134; 280/124.135; 188/218 XL

(58) Field of Classification Search ................ 188/71.1, 188/73.1, 218 XL; 280/93.512, 124.134, 280/124.135, 124.137, 124.139
See application file for complete search history.

(56) References Cited

U.S. PATENT DOCUMENTS

| | | | |
|---|---|---|---|
| 3,692,150 A | 9/1972 | Ruppe | |
| 3,709,561 A | 1/1973 | De Biasse | |
| 3,927,740 A | 12/1975 | Zarembka | |
| 4,007,814 A | 2/1977 | Berger | |
| 4,511,021 A | 4/1985 | Grider | |
| 4,550,809 A | 11/1985 | Kawaguchi | |
| 4,557,356 A | 12/1985 | Petersen | |
| 4,582,175 A | 4/1986 | Yanai | |
| 4,596,312 A | 6/1986 | Kawaguchi | |
| 4,600,090 A | 7/1986 | Feldmann | |
| 4,641,731 A | 2/1987 | Kawaguchi | |
| 4,660,683 A | 4/1987 | Hayashi | |

(Continued)

FOREIGN PATENT DOCUMENTS

JP            61236935            10/1986

(Continued)

*Primary Examiner*—Christopher Ellis
*Assistant Examiner*—Joseph Rocca
(74) *Attorney, Agent, or Firm*—Osler, Hoskin & Harcourt LLP

(57) ABSTRACT

A two-wheel-drive sport all-terrain vehicle (ATV) has a front drive geometry in which the scrub radius is zero or negative combined with a low king pin axis angle, which desirably reduces both steering kickback and lateral pull during braking. The scrub radius less than or equal to zero can be achieved by outwardly displacing the king pin axis, which is defined by the upper and lower pivotal joints of the upper and lower A-arms of the front suspension. To displace the king pin axis outwardly, the disk brake and associated caliper are inverted. The disk brake is supported by support arms extending inwardly from the wheel hub. The disk brake includes an aperture to accommodate both the lower pivotal joint, which protrudes through the plane of the disk, and the inverted caliper. The front suspension further includes a knuckle pivotally connected to the A-arms and an integral aluminum spindle. For further compactness, the wheel hub includes angular-contact bearings.

18 Claims, 14 Drawing Sheets

U.S. PATENT DOCUMENTS

| | | | |
|---|---|---|---|
| 4,662,467 A * | 5/1987 | Arai et al. | 180/210 |
| 4,662,482 A | 5/1987 | Bass | |
| 4,700,813 A | 10/1987 | Rath | |
| 4,716,993 A | 1/1988 | Bass | |
| 4,747,473 A | 5/1988 | Bok | |
| 4,749,065 A | 6/1988 | Loeber | |
| 4,757,883 A | 7/1988 | Thiel | |
| 4,784,246 A | 11/1988 | Edmisten | |
| 4,802,688 A * | 2/1989 | Murakami et al. | 280/124.138 |
| 4,863,001 A | 9/1989 | Edmisten | |
| 4,875,703 A * | 10/1989 | Murakami | 280/124.138 |
| 4,890,700 A | 1/1990 | Guichard | |
| 4,934,729 A * | 6/1990 | Murata et al. | 280/12.136 |
| 5,226,737 A * | 7/1993 | Sandy, Jr. | 384/512 |
| 5,299,667 A | 4/1994 | Hammond | |
| 5,348,334 A * | 9/1994 | Giltinan | 280/124.138 |
| 5,496,055 A * | 3/1996 | Shibahata et al. | 280/124.141 |
| 5,558,186 A | 9/1996 | Hyde | |
| 5,560,452 A | 10/1996 | Labougle | |
| 5,732,798 A | 3/1998 | Toson | |
| 5,850,895 A | 12/1998 | Evrard | |
| 5,992,587 A * | 11/1999 | Maldonado | 188/344 |
| 6,105,234 A | 8/2000 | Kremsmair | |
| 6,238,255 B1 | 5/2001 | Takase | |
| 6,264,241 B1 * | 7/2001 | Horiuchi | 280/781 |
| 6,318,810 B1 | 11/2001 | Miyake | |
| 6,431,569 B2 * | 8/2002 | Handa | 280/124.138 |
| 6,516,910 B2 | 2/2003 | Buell | |
| 6,561,298 B2 | 5/2003 | Buell | |
| 6,609,585 B2 | 8/2003 | Buell | |
| 6,773,077 B2 | 8/2004 | Buell | |
| 7,278,521 B2 * | 10/2007 | Idei et al. | 188/218 XL |
| 2004/0018643 A1 | 1/2004 | Seul et al. | |
| 2004/0134720 A1 * | 7/2004 | Niebling et al. | 188/18 A |

FOREIGN PATENT DOCUMENTS

| | | |
|---|---|---|
| JP | 3197290 | 8/1991 |

* cited by examiner

FRONT DRIVE GEOMETRY FOR AN ALL-TERRAIN VEHICLE

CROSS-REFERENCE TO RELATED APPLICATIONS

This application claims priority from U.S. Provisional Patent Application No. 60/586,217 filed Jul. 9, 2004 and entitled FRONT DRIVE GEOMETRY FOR AN ALL-TERRAIN VEHICLE.

FIELD OF THE INVENTION

The present invention relates generally to an all-terrain vehicle (ATV) and, more particularly, to a front drive geometry of a two-wheel-drive sport ATV.

BACKGROUND OF THE INVENTION

FIG. 1 shows a front elevation view of a typical, prior-art front drive geometry for a two-wheel-drive (2WD) sport all-terrain vehicle (ATV), generally designated by reference numeral 10. The 2WD sport ATV has a frame 12 and a front suspension system connected to the frame for supporting each front wheel 14 having a diameter for receiving a tire of less than 11 inches in diameter. For the sake of simplicity, FIG. 1 only shows the left front wheel and the associated components of a left front drive assembly 20. The front drive assembly includes a front suspension assembly 30. The front suspension assembly includes an A-arm suspension system featuring an upper A-arm 32 and a lower A-arm 34, both of which are pivotally connected to the frame. FIG. 1 also shows a shock absorber 37 which is pivotally connected to the frame and to the lower A-arm. The upper and lower A-arms are pivotally connected to a knuckle 40 at upper and lower pivotal joints 36, 38 (which are preferably rod ends having spherical joints). The knuckle receives and supports a cast and press-fitted steel spindle 42. As is known in the art, a wheel hub 50 includes one or more bearings to facilitate rotation of hub relative to the spindle 42. As is known in the art, the wheel hub usually has a plurality of fasteners (typically four or five lugs) for fastening the wheel to the hub. A low-pressure balloon tire is installed on the rim of the wheel and inflated to a pressure usually no more than 2 kg/cm$^2$ (which is 196 kPa or 28 psi). A disk brake 60 is affixed to an inner portion of the hub so that the tire, wheel, hub and disk brake rotate in unison with respect to the spindle, knuckle, and A-arms.

The upper and lower pivotal joints together define an axis of rotation known in the art as a "king pin axis" 80. When a driver turns the handlebars, the front wheel will rotate about the king pin axis. As shown in FIG. 1, the front wheel and low-pressure balloon tire defines a central plane of the wheel which is represented two-dimensionally by a wheel center line 70. When the wheel center line is vertical, the camber is said to be 0 degrees although small variations in the camber are common. Moreover, the camber seldom remains constant due to the compression of the suspension during ride. Due to the travel of the suspension, the camber will typically take on negative values, for instance less than –5 degrees. As is known in the art, the range of camber values depends on factors such as the turning characteristics of the vehicle and wheel travel constraints.

An important parameter governing vehicle dynamics and driver comfort is what is known in the art as a "scrub radius" 90. The scrub radius 90 is defined as the distance between the extended centerline of the steering axis (king pin axis) and the centerline of the tire where the tread contacts the ground. If the steering centerline is inboard of the tire centerline, the scrub radius is positive. If the steering centerline is outboard of the tire centerline, the scrub radius is negative. In other words, the scrub radius is defined as the distance between a first point where a downward projection of the king pin axis intersects the ground and a second point where a downward projection of the wheel center line intersects the ground. By convention, the scrub radius is measured using a frame of reference located at the second point and directed inwardly toward a central longitudinal axis of the vehicle. Alternatively, the scrub radius (SR) can be conveniently computed as SR=D1–D2 where D1 is the distance from the central longitudinal axis of the vehicle to the point where a downward projection of the king pin axis intersects the ground and D2 is the distance from the central longitudinal axis to the point where a downward projection of the wheel center line intersects the ground.

In all prior-art sport-type two-wheel-drive ATVs known to the Applicant, the scrub radius is positive because the 10-inch rims (which are customarily used on these sport vehicles to reduce the gyroscopic effect at higher speeds) are too small to permit tight packaging of the front wheel assemblies. In other words, in prior-art 2WD sport ATVs, the downward projection of the wheel center line intersects the ground at a point that is further outward from the central longitudinal axis of the vehicle than the point where the downward projection of the king pin axis intersects the ground. Stated otherwise, the king pin axis does not intersect the wheel center line above the ground.

Referring now to FIG. 2, the prior-art 2WD sport ATV having a positive scrub radius 90 has a tendency to suffer from steering kickback and lateral pull during braking. Lateral pull and steering kickback arise due to a moment M created when forces ($F_{IMPACT}$ and/or $F_{GROUND}$) act about the scrub radius 90 (which acts as a lever arm for these forces). These forces typically result from braking or impacts on the front wheel. Impacts due to collision with obstacles (e.g. rocks, stumps or branches) can be at ground level or above ground.

At ground level, hard braking exerts a force $F_{GROUND}$ on the front wheel, especially when the ground adherence changes suddenly. Likewise, a ground-level obstacle will exert a force on the front wheel. This ground-level force $F_{GROUND}$ creates a turning moment M about the scrub radius 90 (which acts as a lever arm). These impacts cause the front wheel to "open", i.e., the front wheel rotates undesirably in the direction of the impact. In turn, this causes the ATV to "pull" laterally. In order to compensate for this deleterious consequence of a positive scrub radius, the driver will often momentarily release the brakes, which will undesirably increase braking distance with the consequent effect of eroding the driver's confidence in the vehicle. In other words, overall braking performance is diminished.

Impacts that occur above ground are typically due to larger obstacles (e.g., rocks, stumps, logs or the like). Where the ATV is able to traverse the obstacle, the net force vector of the impact is usually lower than the axle of the front wheel. However, the moment M caused by this above-ground impact $F_{IMPACT}$ is proportional to the height of the impact above the ground. The effective lever arm is a function of both the scrub radius 90 and the length 44 of the spindle 42. The spindle length is, in turn, a function of the scrub radius and the angle of the king pin axis. The above-ground impact also tends to cause the front wheel to "open", i.e. to rotate into the impact, which in turn means that the vehicle "pulls" laterally to the side where the impact occurred. A further consequence of this impact is steering kickback, which is felt by the driver as an unpleasant jolt in the handlebars as the handlebars are forcibly turned into the direction of the impact. Besides causing the vehicle to steer in a generally unwanted direction, the steering kickback is unpleasant and sometimes even painful for the driver. The magnitude of the steering kickback is an important consideration in the design of an ATV as it directly affects the driver's confidence in the vehicle's performance, particularly the driver's perception of the vehicle's capacity to rapidly, safely and comfortably traverse rocky or rugged terrain.

Efforts to reduce the scrub radius in ATVs (and hence to reduce the magnitude of these impact-induced moments) have been constrained primarily by space ("packaging") requirements of the front drive assemblies and associated front suspension components. A typical prior-art front wheel assembly is shown in cross-section in FIG. 3. The front wheel assembly has a conventional, inwardly mounted disk brake 60, a conventional hub 50 with bearings 52, and a two-part, press-fitted knuckle 40 and spindle 42 (usually made of steel). The configuration of these components is illustrated in FIG. 3 and will not be described in greater detail as this type of front drive assembly is already well known to those of ordinary skill in the art. In the case of a sport-type two-wheel-drive ATV, the industry-standard 10-inch rims cannot accommodate these components using this traditional configuration without resulting in a positive scrub radius or a negative scrub radius combined with an undesirably large king pin axis angle. Because the configuration of the prior-art front drive assembly inevitably results in a geometry having a positive scrub radius, the prior-art ATVs suffer from lateral "pull" during braking as well as steering kickback.

Accordingly, there remains a need for a two-wheel-drive sport ATV which overcomes at least some of the deficiencies associated with front drive geometries having a positive scrub radius.

SUMMARY OF THE INVENTION

It is therefore an object of the present invention to provide a two-wheel-drive sport ATV with a front drive geometry in which the scrub radius is zero or negative while maintaining a suitably low king pin axis angle. By providing a scrub radius that is less than or equal to zero, the vehicle dynamics are improved. Specifically, the nil or negative scrub radius not only lessens lateral pull during braking but also diminishes steering kickback, thereby improving vehicle dynamics and driver comfort. A scrub radius less than or equal to zero is achieved by repackaging the front wheel assembly so as to displace the steering axis (king pin axis) outwardly relative to the central longitudinal axis of the vehicle. In other words, the upper and lower pivotal joints 36, 38 are moved further into the wheel so as to provide a tighter packaging. The front wheel assembly can be repackaged by inverting the disk brake and caliper, providing angular-contact bearings in the hub and utilizing an integrally formed knuckle and spindle.

In accordance with an aspect of the present invention, a two-wheel-drive sport all-terrain vehicle includes a frame defining a central longitudinal axis coincident with a travel direction of the vehicle; a straddle seat mounted on the frame for supporting a driver; only four wheels suspended from the frame, the four wheels including a front pair of wheels mounted to a front wheel axle and a rear pair of wheels mounted to a rear wheel axle, each wheel being disposed with a low-pressure balloon tire; a handlebar disposed on the frame, the handlebar being operatively connected to at least one of the wheels for steering the vehicle; an engine mounted on the frame, the engine being operatively connected to at least one of the rear wheels to propel the vehicle over the ground; each front wheel defining a wheel center line and being supported by an upper pivotal joint and a lower pivotal joint, the upper and lower pivotal joints defining a king pin axis about which the front wheel can be rotated for steering the vehicle; whereby a downward projection of the wheel center line intersects the ground at a first distance D1 from the central longitudinal axis of the vehicle; whereby a downward projection of the king pin axis intersects the ground at a second distance D2 from the central longitudinal axis; whereby a scrub radius (SR) is defined as SR=D1−D2, wherein SR$\leq$0.

In accordance with another aspect of the present invention, a two-wheel-drive sport all-terrain vehicle includes a frame defining a central longitudinal axis coincident with a travel direction of the vehicle; a straddle seat mounted on the frame for supporting a driver; a rear suspension system for supporting rear wheels disposed with low-pressure balloon tires; an engine mounted to the frame for powering at least one of the rear wheels; a front suspension system for supporting front wheels, each front wheel defining a wheel center line and being disposed with low-pressure balloon tires, the front suspension system including an upper pivotal joint and a lower pivotal joint together defining a king pin axis about which each front wheel can be rotated; wherein a downward projection of the king pin axis onto the ground defines a first point that is at least as far from the central longitudinal axis as a second point defined by a downward projection of the wheel center line onto the ground, the distance between the first and second points as measured from the second point toward the central longitudinal axis thereby defining a scrub radius that is zero or negative.

In one embodiment, each front wheel includes a wheel hub having a plurality of support arms for supporting a disk of an inverted (or externally held) disk brake, the support arms extending from the wheel hub inwardly toward the central longitudinal axis of the vehicle.

In another embodiment, the all-terrain vehicle includes a brake caliper having a caliper housing including a hydraulic actuator for causing a pair of opposed gripping surfaces to frictionally engage the disk, the brake caliper being positioned in an aperture in the disk, the caliper housing and the opposed gripping surfaces together defining an arcuate slot through which the disk may freely rotate in a non-braking condition, the slot facing radically outwardly to define an inverted brake caliper.

In another embodiment, the all-terrain vehicle has a disk brake including a disk having an aperture into which the lower pivotal joint protrudes whereby the lower pivotal joint intersects a plane of the disk brake.

In another embodiment, the front wheel comprises a knuckle pivotally connected to upper and lower A-arms to form the upper and lower pivotal joints, respectively, which together define the king pin axis. In this embodiment, the knuckle is integrally formed with a spindle upon which the front wheel can be rotated.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

Figure 4:
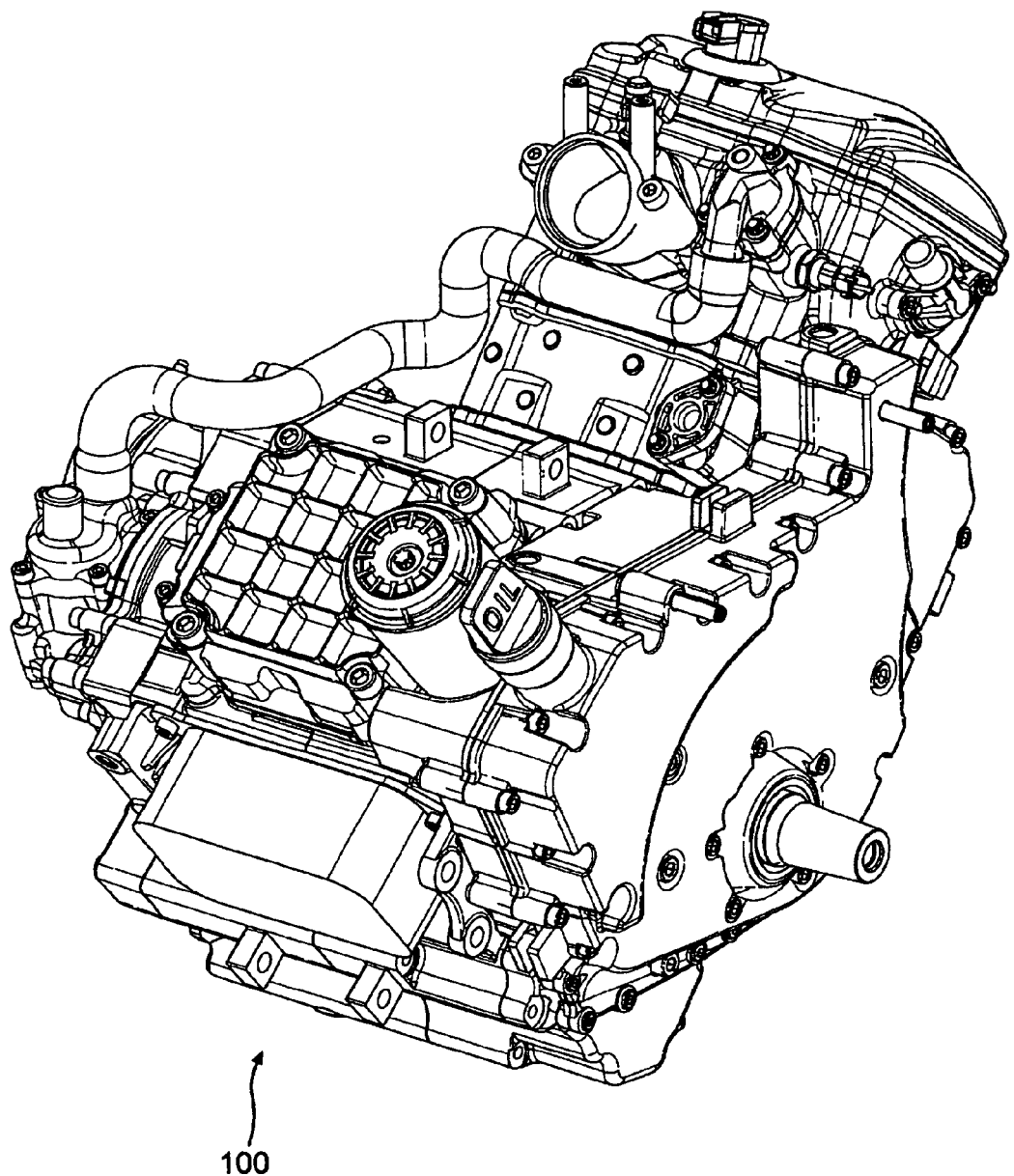
FIG. 4 is an isometric perspective view of a two-wheel-drive sport ATV having a front drive geometry incorporating an embodiment of the present invention.

FIG. 4 is an isometric perspective view of a two-wheel-drive (2WD) sport all-terrain vehicle (ATV), generally designated by reference numeral 10, incorporating a front drive geometry in accordance with an embodiment of the present invention. The ATV 10 includes a frame 12 to which is mounted a body 13 and an internal combustion engine (not visible) for powering the vehicle. Also connected to the frame are four wheels 14 with low-pressure balloon tires 15 which are adapted for off-road conditions and traversing rugged terrain. The ATV 10 further includes a straddle seat 18 mounted to the frame 12 for supporting a driver and optionally one or more passengers. The ATV 10 has a center of gravity through which traverses a central longitudinal axis 8 that is coincident with a travel direction of the vehicle.

As shown in FIG. 4, two front wheels 14 are suspended from the frame 12 by respective front suspension assemblies (e.g. double A-arm suspension systems) while two rear wheels 14 are suspended from the frame by respective rear suspension assemblies (e.g., rigid swing arm suspension systems, which are not shown in this figure). The front and rear wheels 14 have 10-inch rims and are each disposed with a low-pressure balloon tire 15 that is mounted to a rim of each wheel and inflated to a pressure of no more than 2 kg/cm$^2$ (i.e., no more than 196 kPa or 28 psi).

Still referring to FIG. 4, the two-wheel-drive sport ATV further includes a steering mechanism 16 which is rotationally supported by the frame to enable a driver to steer the vehicle. The steering mechanism 16 includes handlebars connected to a steering column (not shown) for actuating steering linkages connected to left and right front drive assemblies 20.

For greater clarity, the "front drive assembly" 20 includes a front wheel assembly and the front suspension assembly. The front suspension assembly includes upper and lower A-arms and a shock absorber, which will be described in greater detail below. The front wheel assembly includes the wheel 14 and the tire 15 as well as a knuckle, a spindle, and a hub, which will also be described in greater detail below.

Figure 5:
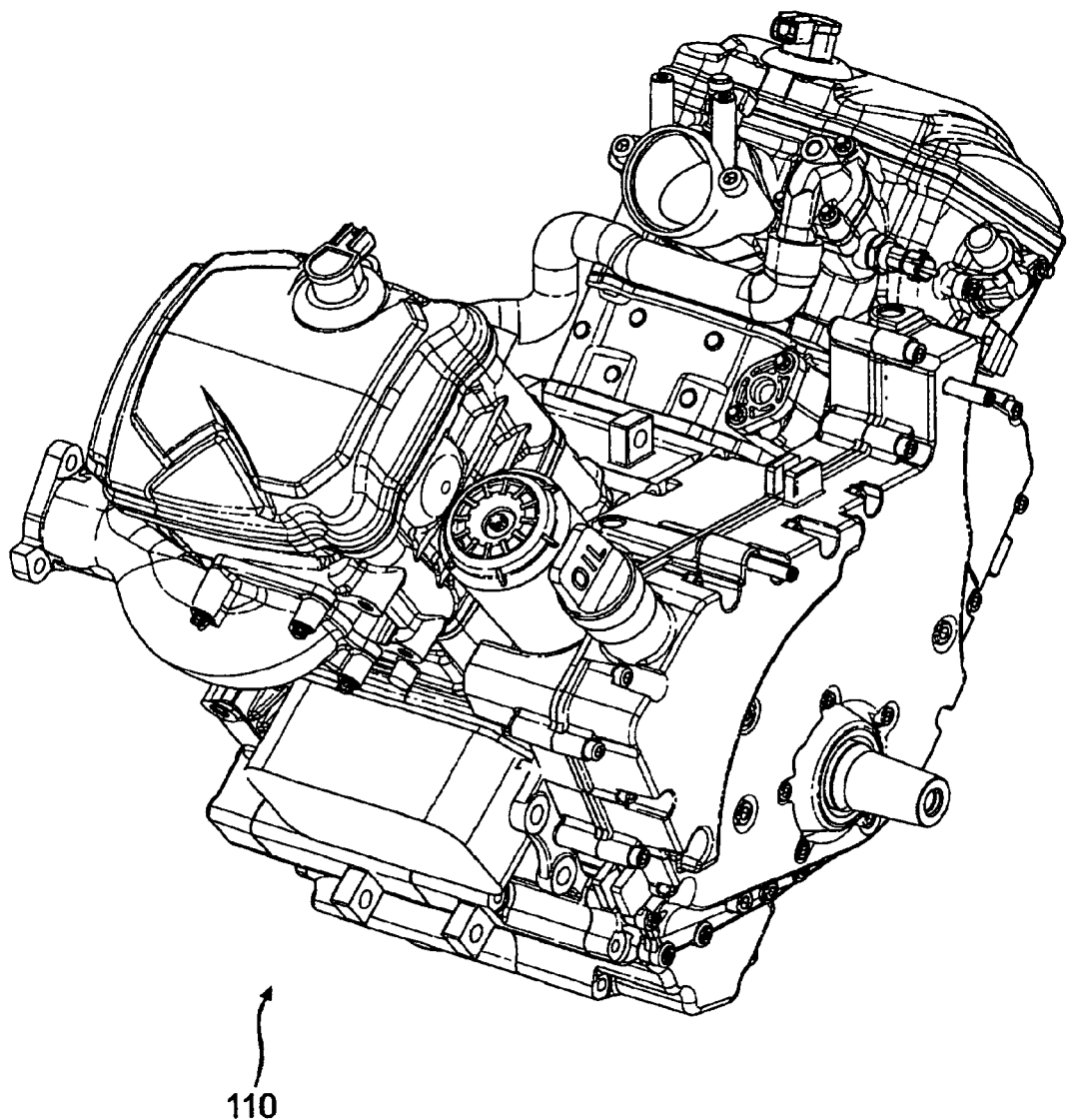
FIG. 5 is a front elevation view, partially sectioned, of a front drive geometry having a negative scrub radius in accordance with a preferred embodiment of the present invention.

FIG. 5 illustrates a left front drive assembly 20 of the 2WD sport ATV having a front drive geometry in accordance with a preferred embodiment of the present invention. As shown in this figure, the scrub radius 90 is negative by virtue of the outward displacement of the steering axis ("king pin axis") 80, which is the axis defined by the upper pivotal joint 36 and the lower pivotal joint 38.

As shown in FIG. 5, a downward projection of the wheel center line 70 intersects the ground at a first distance D1 from the central longitudinal axis of the vehicle. Similarly, a downward projection of the king pin axis 80 intersects the ground at a second distance D2 from the central longitudinal axis. A scrub radius (SR) can thus be defined as SR=D1−D2, where SR≦0. As will be appreciated by those of ordinary skill in the art, there are numerous other ways of defining the scrub radius, having regard to other frames of reference, although by convention the scrub radius is defined as being positive where the king pin axis projects onto the ground at a point closer to the central longitudinal axis than a projection of the wheel center line. Alternatively, the scrub radius can be measured using a frame of reference located at the point where the wheel center line projects onto the ground and oriented toward the central longitudinal axis of the vehicle whereby the scrub radius is negative when, as illustrated, the projection of the king pin axis is further outward from the central longitudinal axis than the wheel center line. Expressed otherwise, the king pin axis does not intersect the wheel center line above the ground. While a negative scrub radius is illustrated as the preferred embodiment, it should be understood that the front geometry in accordance with another embodiment of the present invention has a scrub radius of zero. In this other embodiment, the king pin axis intersects the wheel center line at the ground.

As illustrated in FIG. 5, the front drive assembly 20 further includes a wheel hub 50 housing a pair of angular-contact bearings 53 for rotation of the hub 50 relative to the spindle. In the preferred embodiment, the angular-contact bearings are twin row angular-contact ball bearings. Advantageously, the angular-contact bearings 53 have the property of projecting their "effective load centers" outside the wheel center line. The effective load center, as is known in the art, is the point used to calculate the radial bearing load. Specifically, the outer angular-contact bearing 53 in FIG. 5 has an effective load center that is projected outward of the outer bearing, i.e. even further outward from the wheel center line. Likewise, the inner angular-contact bearing 53 of FIG. 5 has an effective load center that is projected inward of the inner bearing, i.e. even further inward from the wheel center line.

For the sake of illustration, a preferred front drive geometry will now be described with reference to a two-wheel-drive sport-type ATV, such as the one shown in FIG. 5. As mentioned above, this front drive geometry is achieved by repositioning the upper and lower pivotal joints 36, 38 more deeply within the wheel rim. As explained above, the disk brake is inverted and provided with an aperture to avoid interference with the lower pivotal joint 38 which enables the king pin axis to be repositioned further outwardly from the central longitudinal axis of the vehicle. For this particular embodiment, the scrub radius is preferably between 0 and −20 mm and most preferably approximately −6 mm. To achieve this scrub radius, the king pin axis is angled at about 10 degrees to the vertical, although the king pin axis can range between 7 and 15 degrees. Furthermore, as shown in FIG. 5, the front drive geometry is designed to have a camber (angle of the wheel center line with respect to the vertical) of −1 degree at ride height, although this can vary between 0 and −3 degrees.

Figure 6:
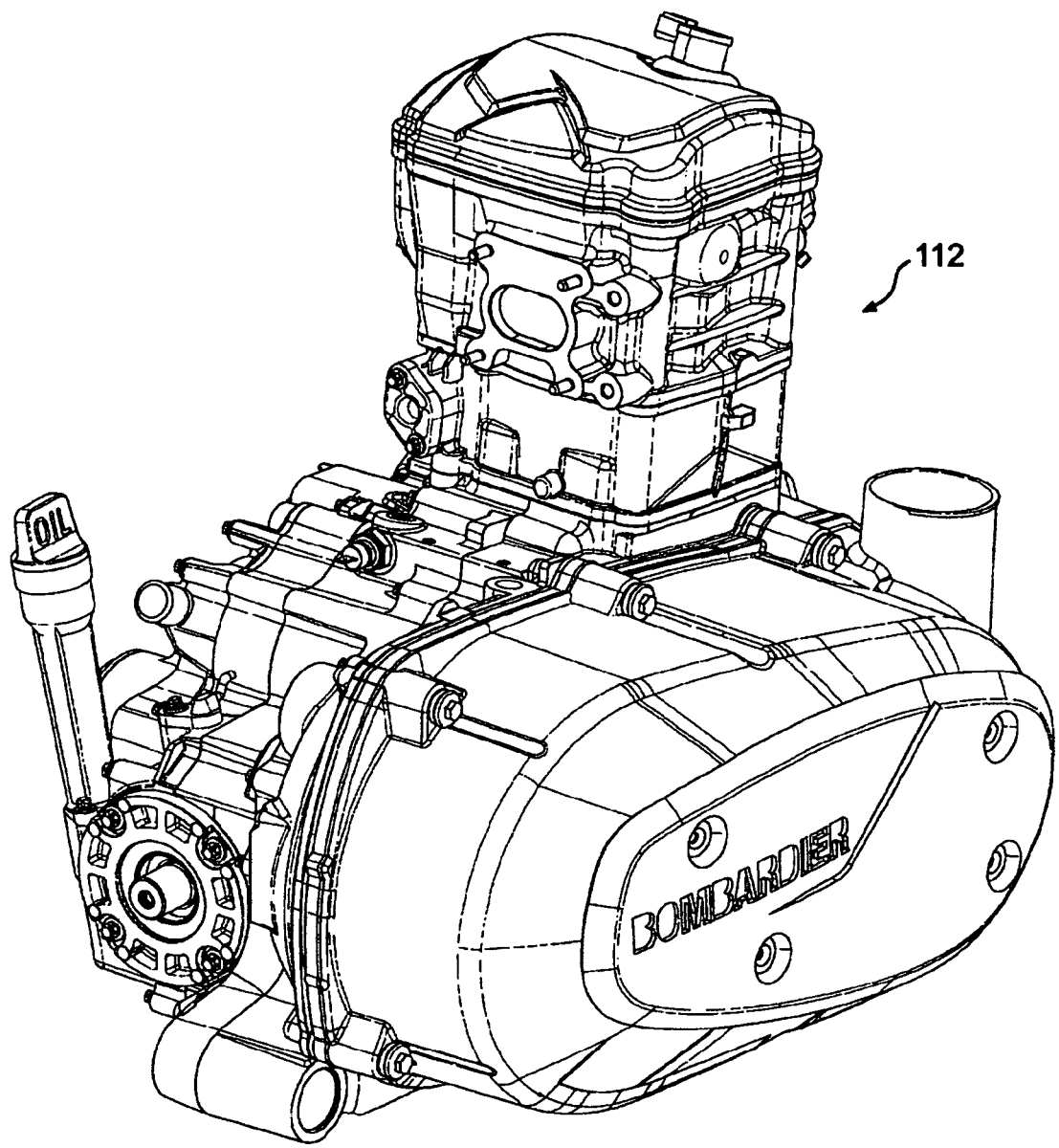
FIG. 6 is a side schematic view of the degree of caster and trail in accordance with the preferred embodiment of the present invention

As shown in FIG. 6, the front drive geometry is preferably designed to have a front wheel caster (designated by reference numeral 92) of about 8 degrees, although this can vary between 6 and 10 degrees. Preferably, the front drive geometry is also designed to have a trail (designated by reference numeral 94) of about 35 mm, although this can vary between 25 mm and 40 mm. It should be understood that the foregoing dimensions are merely illustrative of one embodiment of the present invention. It will be understood by those of ordinary skill in the art that the dimensions will vary depending on the size and type of vehicle and on the exact layout of the front drive assembly.

Figure 1:
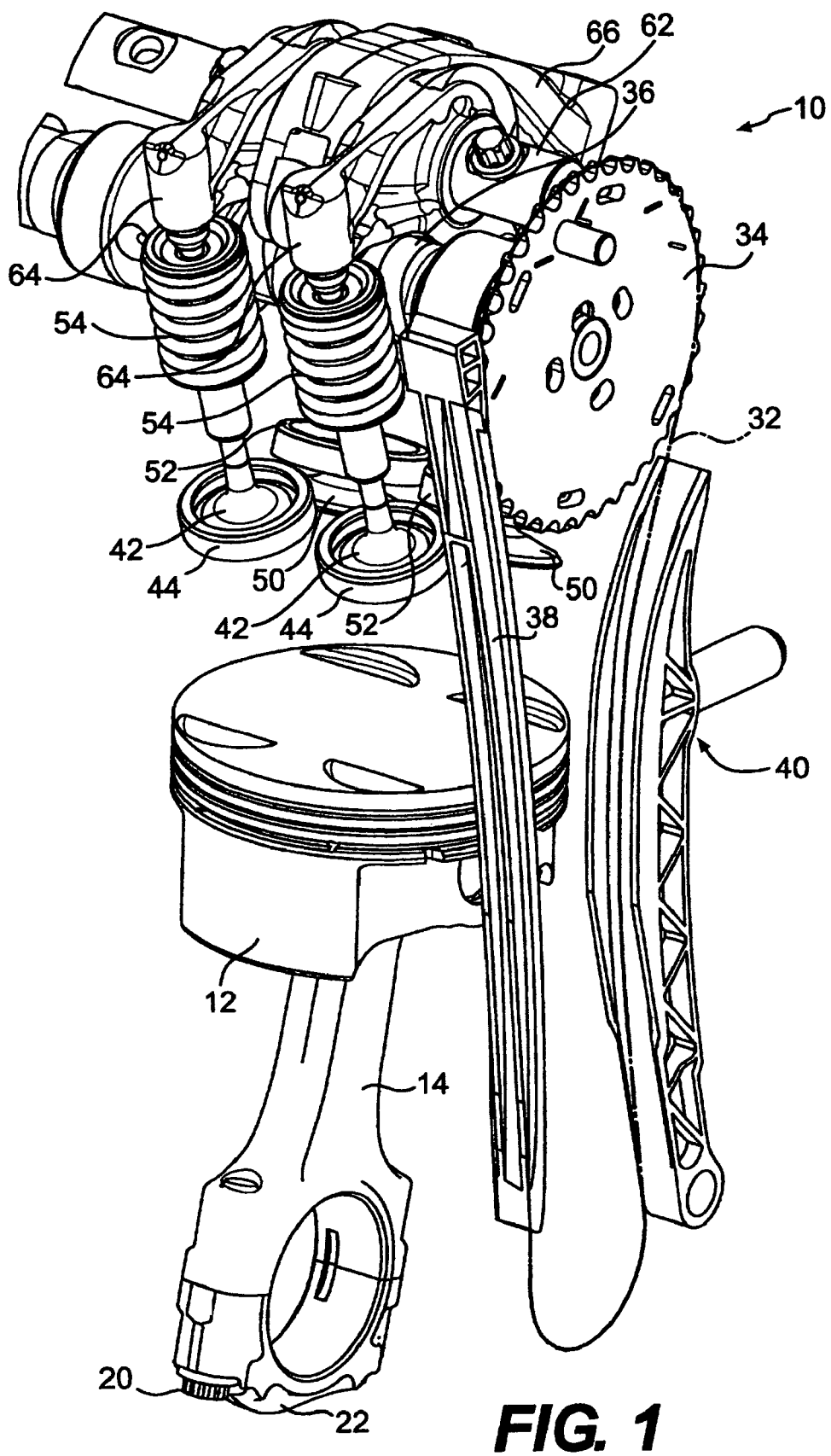
FIG. 1 is a front elevation view of a front drive geometry in accordance with the prior art.
Figure 2:
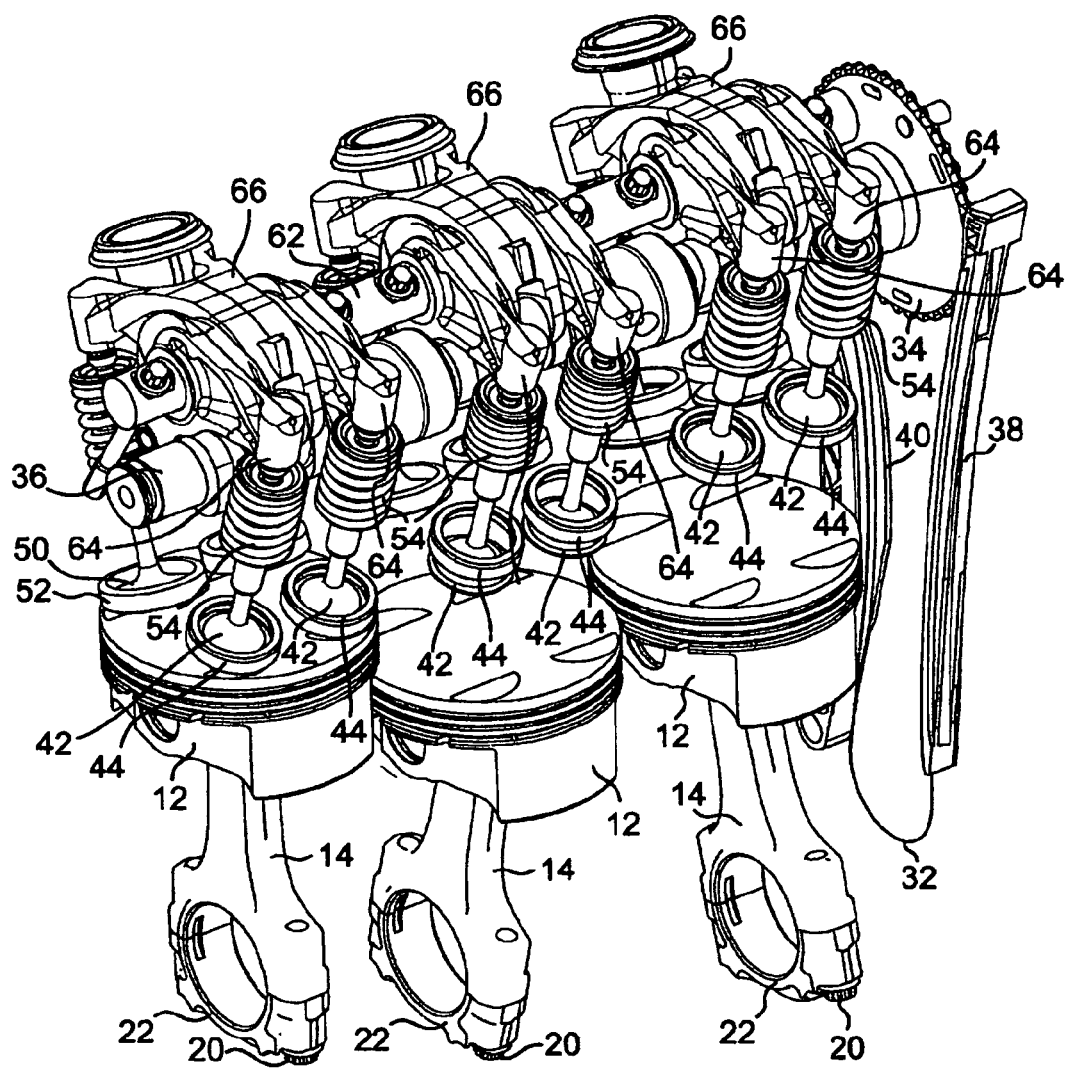
FIG. 2 is an isometric perspective view showing exemplary impact forces and resultant moments that frequently act on a prior-art front drive geometry causing lateral pull and steering kickback.
Figure 3:
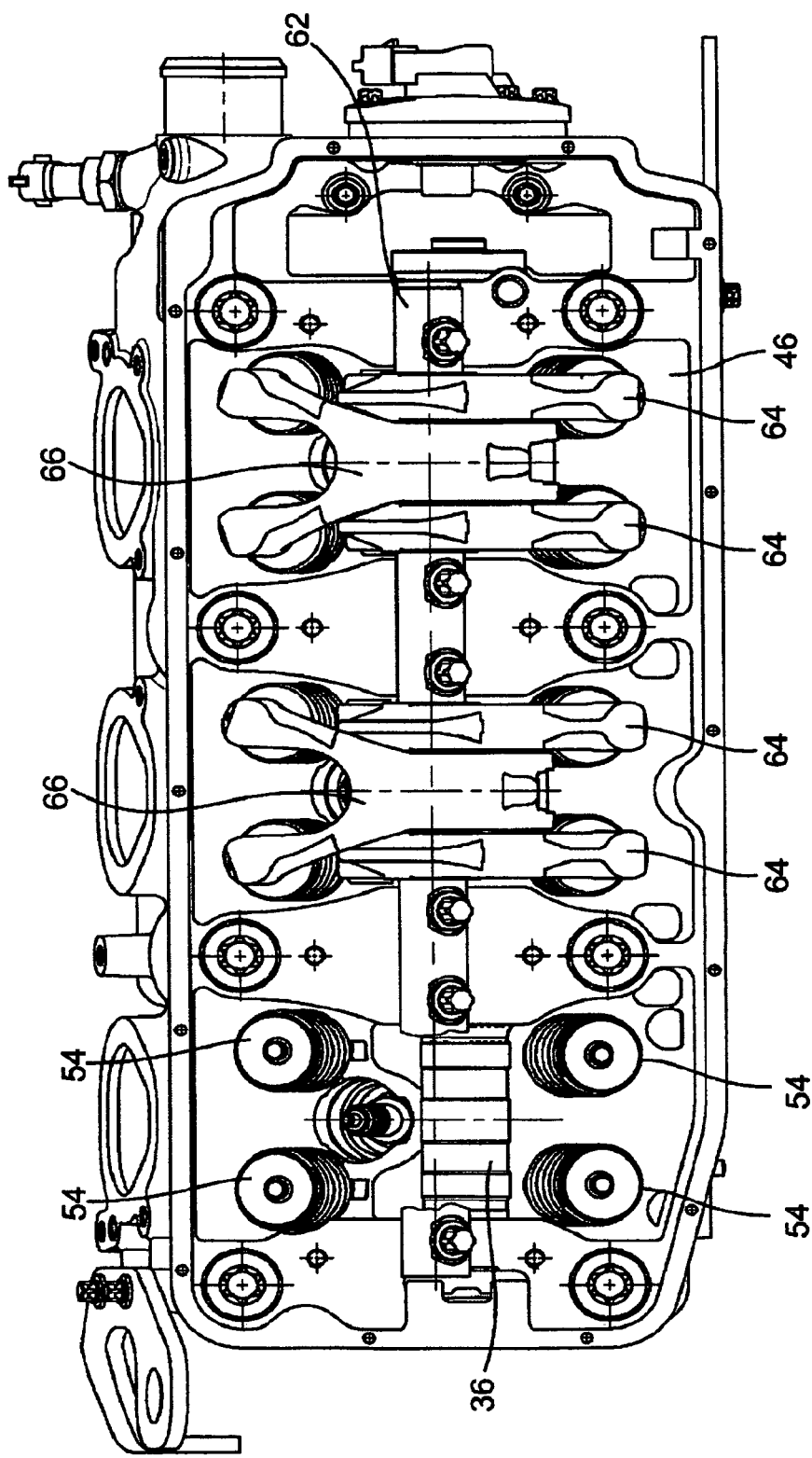
FIG. 3 is a cross-sectional view, cut through a frontal plane perpendicular to a central longitudinal axis of the vehicle, showing a front wheel assembly with an inwardly mounted disk brake, conventional hub bearing, and two-part, press-fitted knuckle and spindle in accordance with the prior art.
Figure 7:
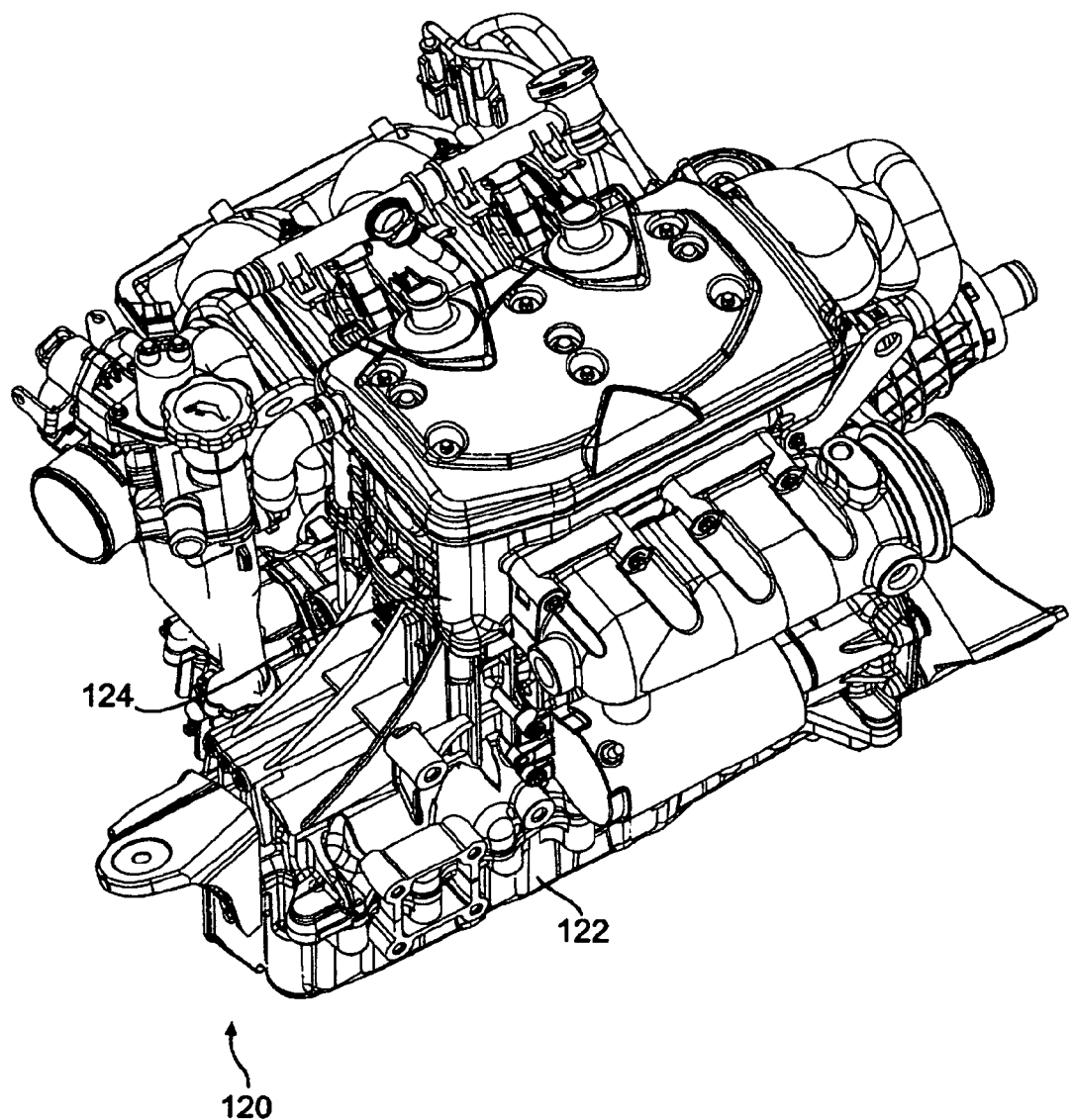
FIG. 7 is an isometric perspective view showing a force and moment analysis for a front drive system having a negative scrub radius in accordance with another embodiment of the present invention.
Figure 8:
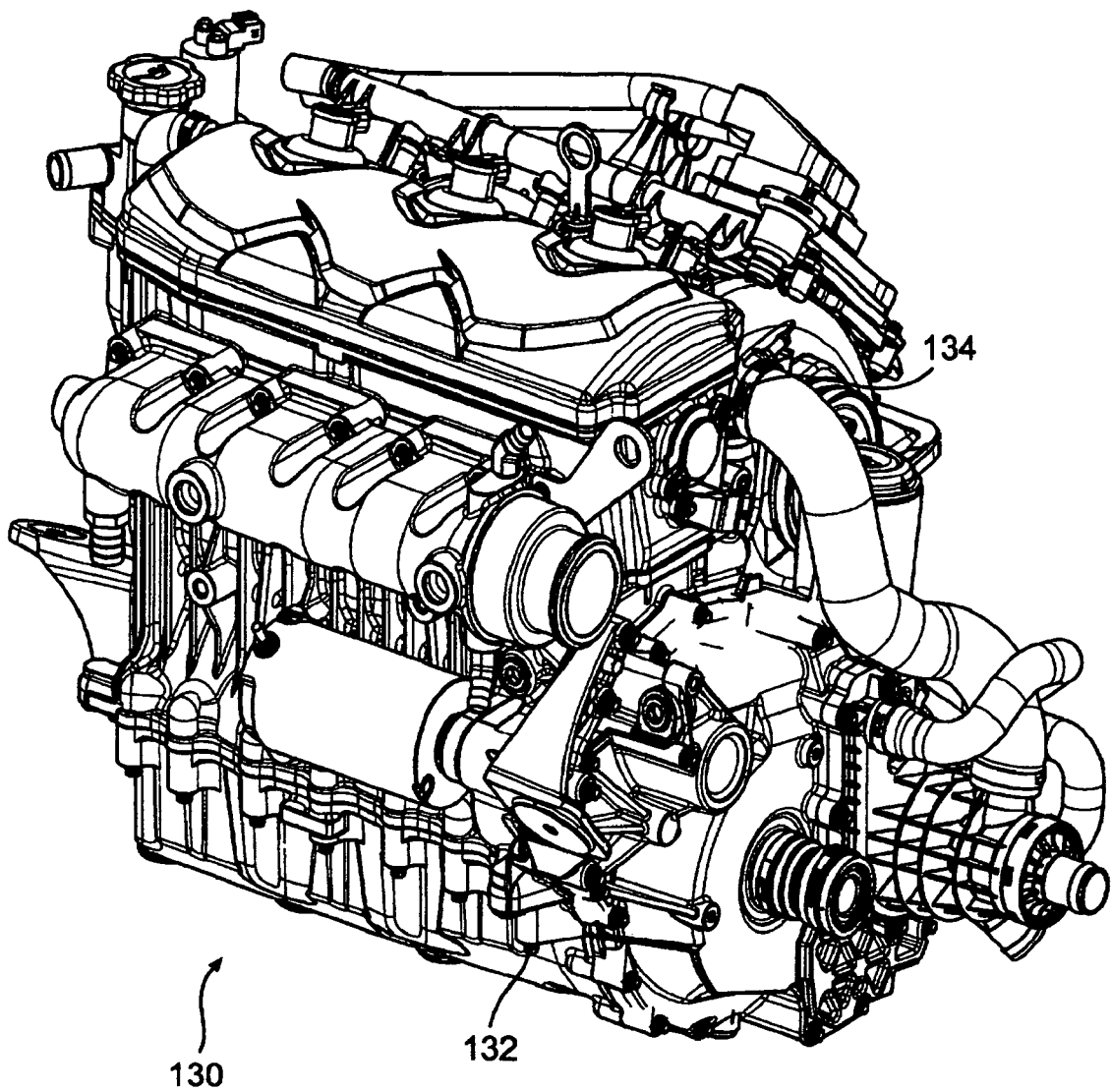
FIG. 8 is a schematic view of the corrective effect of a negative scrub radius on the ATV's response to an impact on the front right wheel.

As shown in FIG. 7, because the front drive geometry has a negative scrub radius, the moment M caused by a ground-level force ($F_{GROUND}$) is in a direction opposite to the moment M experienced by the prior-art ATV shown in FIG. 2. As shown in FIG. 7, for a force exerted on the left front wheel, the moment due to the negative scrub radius causes the left front wheel to turn to the right. Likewise, as shown in FIG. 8, an impact on the right front wheel causes the front wheels to turn to the left, i.e. "away" from the impact. When an impact on the right front wheel occurs, a clockwise moment is created about the center of gravity of the ATV. The clockwise moment about the center of gravity of the vehicle is proportional to the perpendicular distance to the central longitudinal axis of the vehicle. This clockwise moment about the center of gravity is mitigated to some extent by the counterclockwise moment about the king pin axes causing the wheels to turn to the left. As a consequence of these countervailing moments, vehicle dynamics are improved as is driver stability and comfort.

Figure 9:
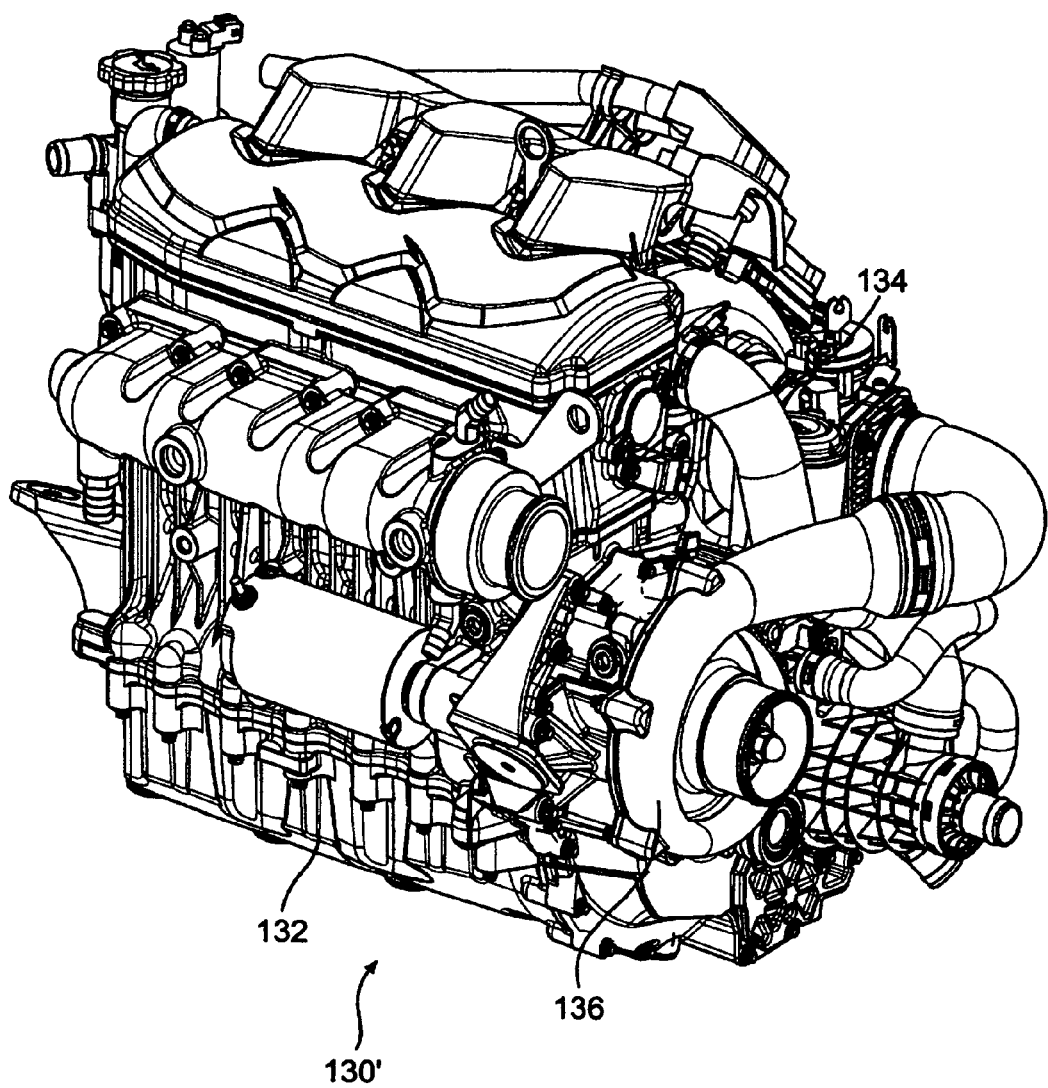
FIG. 9 is an isometric perspective view of the front drive assembly in accordance with the preferred embodiment of the present invention, shown with the wheel and tire.
Figure 10:
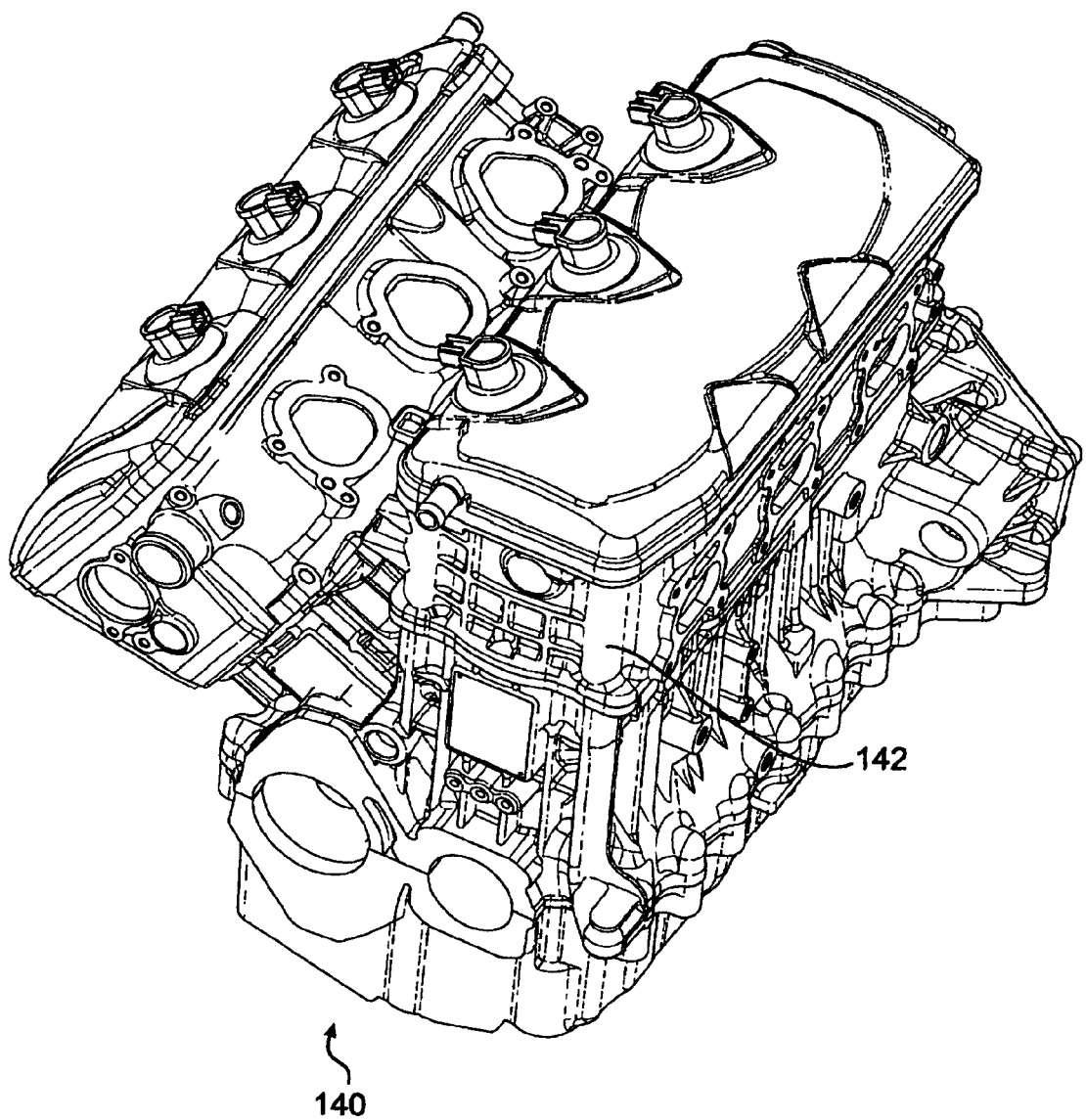
FIG. 10 is an exploded view of the front drive assembly in accordance with the preferred embodiment of the present invention, shown without the wheel and tire.
Figure 11:
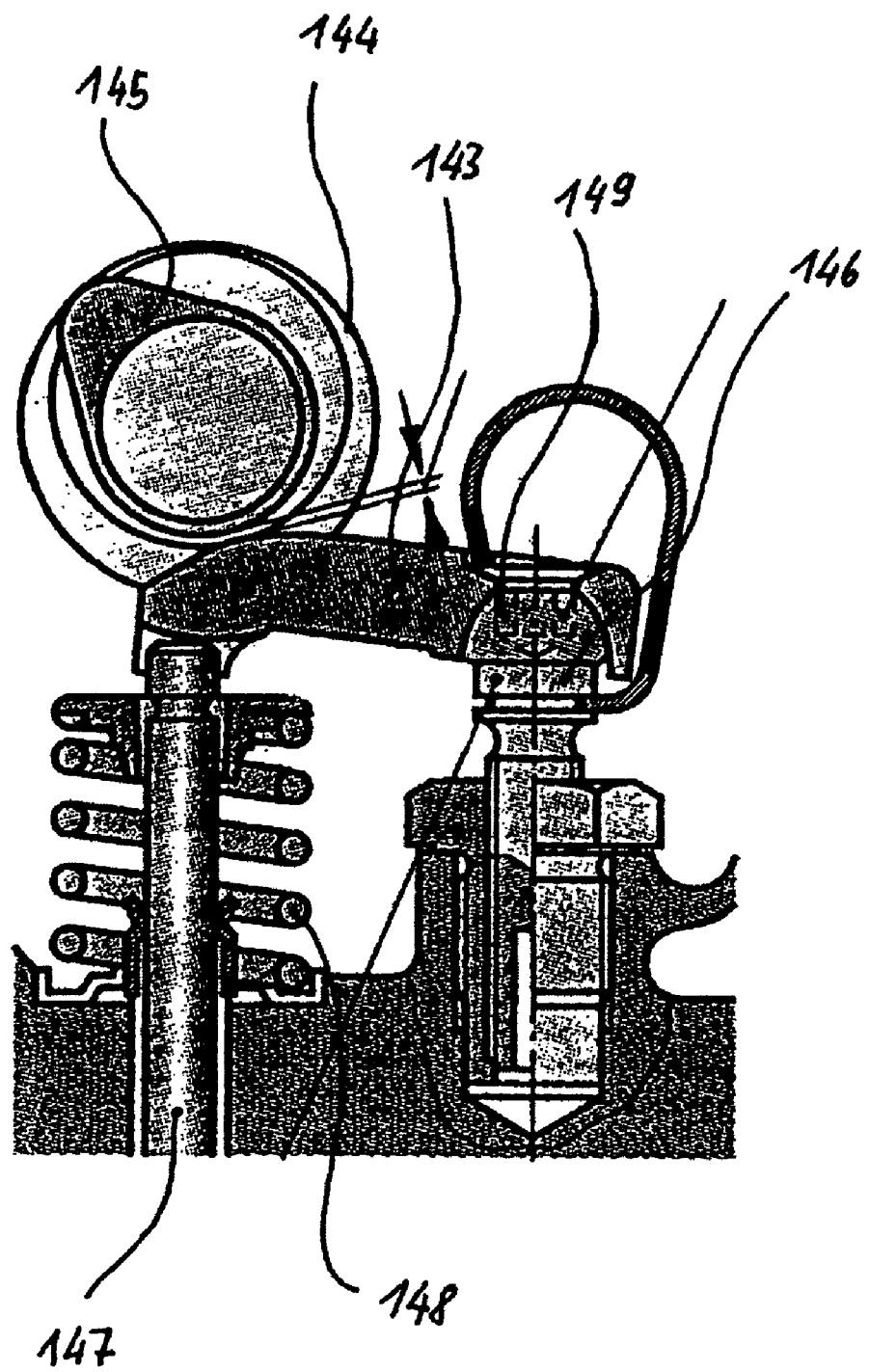
FIG. 11 is an isometric perspective view of the front drive assembly in accordance with the preferred embodiment of the present invention, shown without the wheel and tire.
Figure 12:
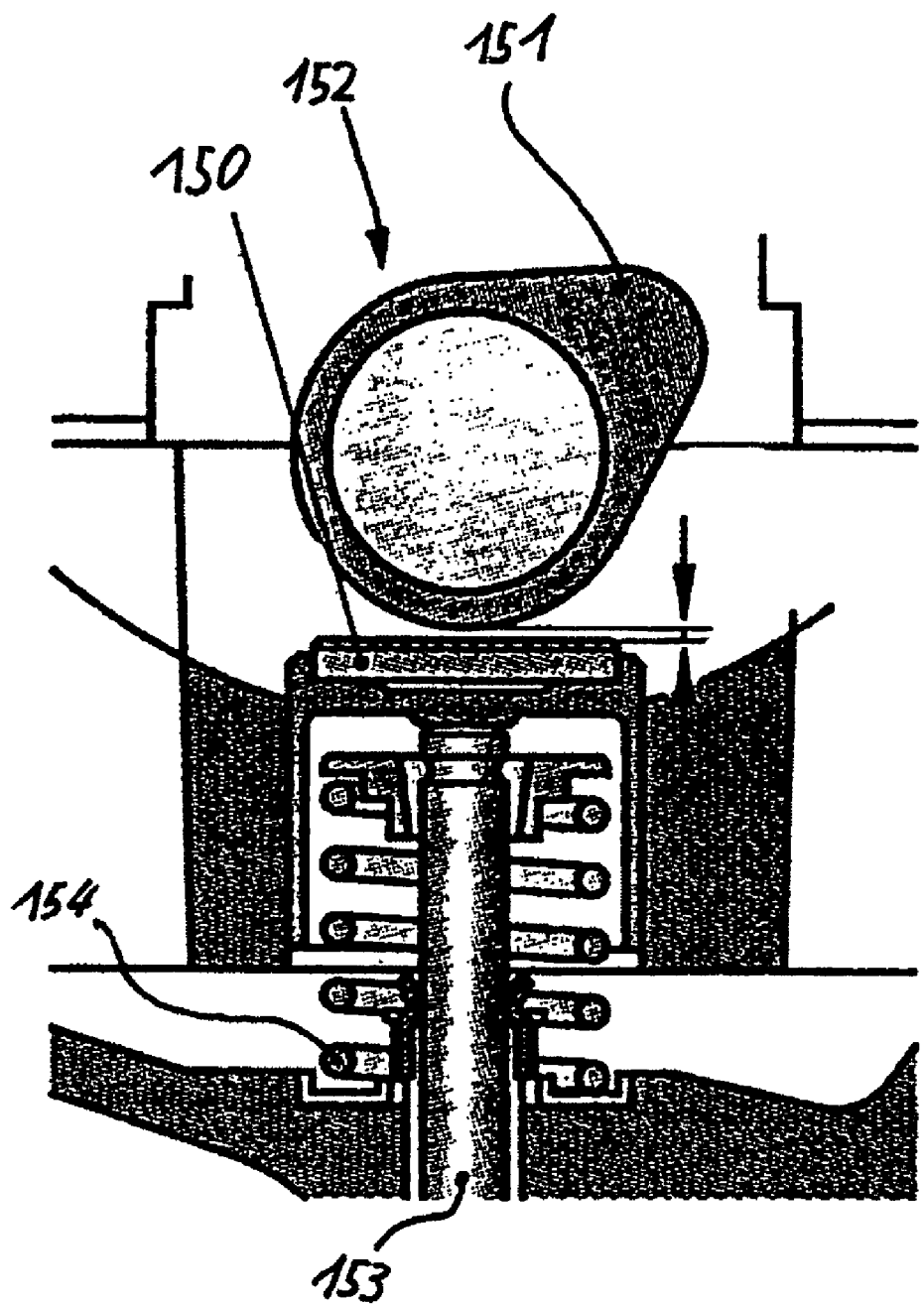
FIG. 12 is an isometric perspective view of the front drive assembly in accordance with the preferred embodiment of the present invention, shown without the wheel and tire.

The best mode known to the Applicant to achieve a scrub radius that is less than or equal to zero is to reconfigure ("repackage") the front wheel assembly 20 as shown in FIG. 9. This can preferably be achieved by inverting the disk brake 60 and associated caliper and by employing angular-contact bearings in the wheel hub and an integral knuckle-and-spindle unit, as shown in FIGS. 10 to 12. As shown in FIG. 9, the repackaging is achieved without modifying the wheel 14, tire 15, upper A-arm 32, lower A-arm 34, steering linkage 35, or the shock absorber 37.

Referring now to FIG. 10, the front drive assembly 20 includes a wheel hub 50 having four support arms 55 for supporting a disk 60 of an inverted disk brake. As shown in FIG. 10, the four support arms 55 extend from the wheel hub 50 inwardly toward the central longitudinal axis of the vehicle. In the preferred embodiment, threaded fasteners (not shown) are used to detachably connect the disk 60 to each of the four support arms 55. The fasteners are inserted through holes 56 in the support arms 55 and through holes 61 in the disk 60. As will be readily appreciated by those of ordinary skill in the art, the number of support arms 55 can be varied.

As shown in FIG. 10, the wheel hub 50 further includes four threaded bores 51 for receiving wheel lugs (not shown) for mounting each wheel to the hub 50 in a manner well known in the art.

As shown in FIG. 10, the front wheel includes a knuckle 40 that is pivotally connected to the upper A-arm 32 and lower A-arm 34 to form the upper pivotal joint 36 and lower pivotal joint 38, respectively. In the preferred embodiment, the knuckle 40 is integrally formed with a spindle 42 for rotationally supporting the front wheel. The knuckle-and-spindle unit 40, 42 is preferably made of aluminum or, alternatively, it could be made of steel. For the preferred embodiment described above, the spindle 42 preferably has a diameter greater than 20 mm (0.8 inches) and more preferably about 30 mm (1.2 inches). The spindle 42 is made stubbier (shorter) to accommodate both a negative scrub radius and a shallow angle for the king pin axis. Given the angle of the king pin axis, the magnitude of the scrub radius, and the height of the spindle above ground, a length 44 of the spindle can be determined trigonometrically. As depicted in FIG. 10, the knuckle 40 also includes a steering arm 43 for pivotally connecting to the steering linkage 35. The steering linkage 35 and steering arm 43 are actuated by the steering mechanism (e.g. handlebars) via the steering column to cause the knuckle, spindle and front wheel assembly to turn about the king pin axis.

As further illustrated in FIG. 10, the front drive assembly 20 also includes an "inverted" brake caliper 65 having a two-part caliper housing 66, 68 and brake pads 67. The two-part caliper housing includes a cover 66 and a main body 68 having a hydraulic actuator for causing a pair of opposed gripping surfaces to frictionally engage the disk 60. The opposed gripping surfaces preferably include brake pads 67 as is known in the art. The brake caliper is positioned in an aperture 62 in the disk 60.

As is known in the art, the caliper housing 66, 68 and the opposed gripping surfaces supporting the brake pads 67 together define an arcuate slot through which the disk may freely rotate in a non-braking condition. However, unlike the prior art, the arcuate slot of the preferred embodiment of the present invention faces radically outwardly to thus define an "inverted" brake caliper 65. In order to face radically outwardly, the inverted brake caliper 65 is positioned inside the aperture 62 of the disk 60 as is shown in FIG. 11.

FIGS. 11 and 12 are two different isometric perspective views of the assembled front drive assembly 20 in accordance with the preferred embodiment of the present invention. For compact packaging of the front drive assembly 20, the inverted brake caliper 65 is positioned inside the wheel rim toward the front of rim while the steering linkage 35 is positioned toward the rear of the rim.

As shown in FIGS. 10 to 12, the disk 60 has a plurality of inner and outer undulations 64, i.e. undulations on the outer perimeter of the disk 60 and on the inner perimeter of the aperture 62. These undulations 64 facilitate cleaning of the brake pads 67. The disk 60 is preferably stamped to produce these undulations. As will be appreciated by those of ordinary skill in the art, the shape of the disk may be modified to accommodate other front drive geometries. Persons of ordinary skill in the art will understand that the shape of the disk is a function of a variety of known engineering considerations based upon, for example, stress and heat transfer analyses, non-interference with adjacent components, weight, cost, durability, etc.

Figure 13:
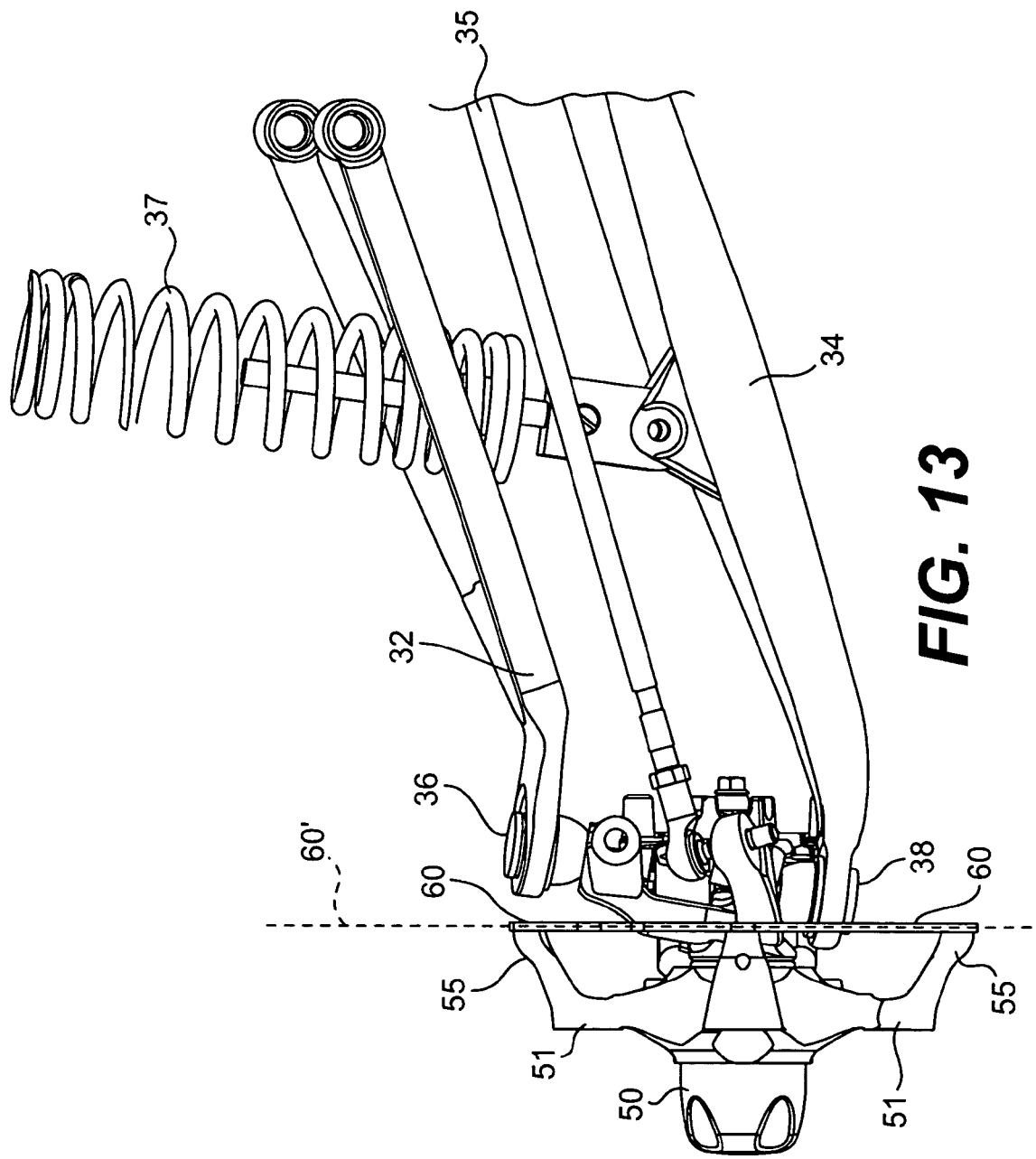
FIG. 13 is a side elevation view of the front drive assembly in accordance with the preferred embodiment of the present invention, again shown without the wheel and tire.

FIG. 13 is a side elevation view of the front drive assembly 20 shown in FIGS. 10 to 12. The aperture 62 in the disk 60 not only accommodates an inverted disk brake but also accommodates the lower pivotal joint 38 which protrudes through the aperture 62 as shown in FIG. 13. In other words, the lower pivotal joint 38 intersects a plane 60' defined by the side of the disk 60. The aperture is designed to enable the lower pivotal joint 38 to move through a full range of motion within the confines of the inverted disk.

In the preferred embodiment, as illustrated in FIG. 13, the disk 60 of the disk brake has a diameter greater than a vertical distance between the upper pivotal joint 36 and the lower pivotal joint 38. As is well known in the art, the braking moment (i.e., the moment that causes the angular deceleration of the rotating wheel and tire) is equal to the product of the force exerted by the brake pads on the disk multiplied by the radius from the axis of rotation of the disk to the effective center of the braking pads. Thus, it is advantageous to enlarge the diameter of the disk as shown in FIG. 13 to provide superior braking capacity. By virtue of the inverted brake caliper positioned with the aperture of the disk, the diameter of the disk can be enlarged substantially over the prior art, occupying space that was, in the prior-art design, occupied by the standard "inner" brake caliper. Thus, not only does the front drive assembly 20 provide a negative or zero scrub radius, one collateral benefit of repackaging the front drive assembly 20 with the inverted brake caliper 65 is superior braking capacity for a given wheel rim size.

As described above, in the preferred embodiment the negative/zero scrub radius is attained by a combination of inverting the disk brake and caliper, providing angular-contact bearings in the hub and by providing an integral knuckle-spindle unit. It should be understood that not all three features are required to achieve the negative/zero scrub radius. Indeed, in certain vehicles, it may be possible to achieve a negative/zero scrub radius by employing only one or two of the above features.

Figure 14:
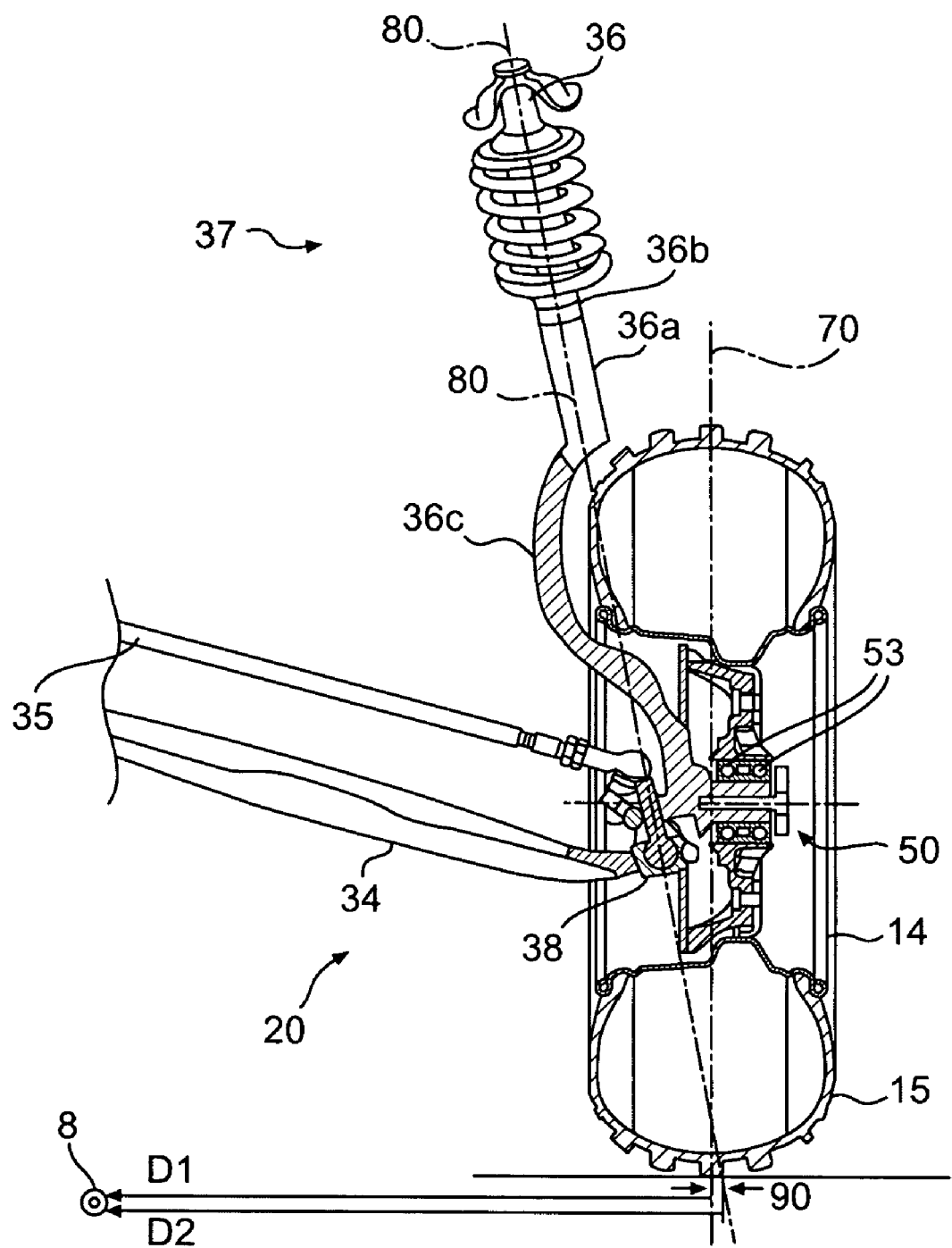
FIG. 14 is a front elevation view, partially sectioned, of a MacPherson-type front suspension having a negative scrub radius in accordance with another embodiment of the present invention.

FIG. 14 is a front elevation view, partially sectioned, of a MacPherson-type front suspension 20 having a negative scrub radius in accordance with another embodiment of the present invention. As illustrated in FIG. 14, the MacPherson-type front suspension 20 includes a lower A-arm 34 pivotally connected to the knuckle at a lower pivotal joint 38, e.g. a lower ball joint. Instead of a lower A-arm, the MacPherson suspension can employ a lower control arm (also known as a "track rod") and a radius rod, as is known in the art.

Unlike the front suspension shown in the preceding figures, the MacPherson front suspension does not have an upper A-arm (or upper control arm) but rather has a strut 36a. The strut 36a includes a spring leg 36b supporting a shock absorber/coil spring unit 37. The strut 36a further includes an upper pivotal joint 38, e.g. an upper ball joint which pivotally connects the strut to the vehicle chassis or frame, as is well known in the art.

As illustrated in FIG. 14, a front drive geometry having a negative (or zero) scrub radius 90 can be achieved by repackaging the MacPherson front suspension so that the king pin axis 80 intersects the wheel center line 70 at a point above the ground. Stated otherwise, the king pin axis 80 is displaced outwardly relative to the wheel center line 70 so that the king pin axis 80 intersects the ground at a point that is at least as far from the central longitudinal axis 8 as the point where the wheel center line 70 intersects the ground, i.e. D1≦D2.

In one embodiment, as shown in FIG. 14, a negative scrub radius can be achieved by providing the strut 36a with a curved lower portion 36.c that connects to the knuckle. The curved lower portion 36c allows the strut to be connected to the knuckle while avoiding interference with the wheel rim and tire. By virtue of the curved lower portion 36c, the strut 36a can be positioned at a mechanically effective angle, as shown, to provide satisfactory shock absorption and proper vehicle dynamics. Thus, the curved lower portion 36c enables the king pin axis to be both angled correctly and positioned outwardly relative to the central longitudinal axis 8 of the vehicle to therefore provide suitable suspension response as well as the desired negative scrub radius.

Persons of ordinary skill in the art will appreciate that variations or modifications may be made to the front drive geometry of the all-terrain vehicle disclosed in the specification and drawings without departing from the spirit and scope of the invention. Furthermore, persons of ordinary skill in the art will appreciate that the front drive assembly described and illustrated merely represents the best mode of implementing the invention known to the Applicant; however, it should be understood that other mechanisms or configurations, using similar or different components, can be used to implement the present invention. Therefore, the embodiments of the invention described above are only intended to be exemplary. The scope of the invention is limited solely by the claims.

I claim:

1. An all-terrain vehicle comprising:
   a frame defining a central longitudinal axis coincident with a travel direction of the vehicle;
   a straddle seat mounted on the frame for supporting a driver;
   front and rear wheels suspended from the frame, each wheel being disposed with a low-pressure balloon tire, the front wheels having a diameter less than 11 inches;
   a handlebar disposed on the frame, the handlebar being operatively connected to at least one of the wheels for steering the vehicle;
   an engine mounted on the frame, the engine being operatively connected to at least one of the rear wheels to propel the vehicle over the ground;
   each front wheel defining a wheel center line and being supported by an upper pivotal joint and a lower pivotal joint, the upper and lower pivotal joints defining a king pin axis, about which the front wheel can be rotated for steering the vehicle; and
   a disk brake including a disk having an aperture into which the lower pivotal joint protrudes whereby the lower pivotal joint intersects a plane of the disk brake; wherein
   (1) a downward projection of the wheel center line intersects the ground at a first distance D1 from the central longitudinal axis of the vehicle;
   (2) a downward projection of the king pin axis intersects the ground at a second distance D2 from the central longitudinal axis;
   (3) a scrub radius (SR) is defined as SR=D1-D2; and
   (4) SR≦0.

2. The all-terrain vehicle as claimed in claim 1 wherein the king pin axis is angled between 3 and 15 degrees with respect to vertical.

3. The all-terrain vehicle as claimed in claim 2 wherein the scrub radius is between 0 and −20mm.

4. The all-terrain vehicle as claimed in claim 2 wherein the disk brake is an inverted disk brake, the front wheel comprises a wheel hub having a support arm for supporting the disk of the inverted disk brake, the support arm extending from the wheel hub inwardly toward the central longitudinal axis of the vehicle.

5. The all-terrain vehicle as claimed in claim 4 further comprising a brake caliper having a caliper housing including a hydraulic actuator for causing a pair of opposed gripping surfaces to frictionally engage the disk, the brake caliper being positioned in an aperture in the disk, the caliper housing and the opposed gripping surfaces together defining a slot through which the disk may freely rotate in a non-braking condition, the slot facing radially outwardly to define an inverted brake caliper.

6. The all-terrain vehicle as claimed in claim 2 wherein the disk of the disk brake has a diameter greater than a vertical distance between the upper pivotal joint and the lower pivotal joint.

7. The all-terrain vehicle as claimed in claim 2 wherein the front wheel includes a wheel hub comprising an angular-contact bearing.

8. The all-terrain vehicle as claimed in claim 2 wherein the front wheel comprises a knuckle pivotally connected to upper and lower A-arms to form the upper and lower pivotal joints, respectively, the knuckle being integrally formed with a spindle for rotationally supporting the front wheel.

9. The all-terrain vehicle as claimed in claim 8 wherein the spindle is made of aluminum and has a diameter greater than 20mm.

10. A two-wheel-drive sport all-terrain vehicle comprising:
a frame defining a central longitudinal axis coincident with a travel direction of the vehicle;
a straddle seat mounted on the frame for supporting a driver;
a rear suspension system for supporting rear wheels disposed with low-pressure balloon tires;
an engine mounted to the frame for powering at least one of the wheels;
a front suspension system for supporting front wheels, each front wheel having a diameter less than 11 inches and defining a wheel center line and being disposed with low-pressure balloon tires, the front suspension system including an upper pivotal joint and a lower pivotal joint together defining a king pin axis about which each front wheel can be rotated; and
a disk brake including a disk having an aperture into which the lower pivotal joint protrudes whereby the lower pivotal joint intersects a plane of the disk brake;
wherein a downward projection of the king pin axis onto the ground defines a first point that is at least as far from the central longitudinal axis as a second point defined by a downward projection of the wheel center line onto the ground, a distance between the first and second points as measured from the second point toward the central longitudinal axis defining a scrub radius that is zero or negative.

11. The all-terrain vehicle as claimed in claim 10 wherein the king pin axis is angled between 3 and 15 degrees with respect to vertical.

12. The all-terrain vehicle as claimed in claim 10 wherein the scrub radius is between 0 and −20mm.

13. The all-terrain vehicle as claimed in claim 11 wherein the disk brake is an inverted disk brake, the front wheel comprises a wheel hub including a support arm for supporting the disk of the inverted disk brake, the support arm extending from the wheel hub inwardly toward the central longitudinal axis of the vehicle.

14. The all-terrain vehicle as claimed in claim 13 further comprising a brake caliper having a caliper housing including a hydraulic actuator for causing a pair of opposed gripping surfaces to frictionally engage the disk, the brake caliper being positioned in an aperture in the disk, the caliper housing and the opposed gripping surfaces together defining a slot through which the disk may freely rotate in a non-braking condition, the slot facing radially outwardly to define an inverted brake caliper.

15. The all-terrain vehicle as claimed in claim 11 wherein the disk of the disk brake has a diameter greater than a vertical distance between the upper pivotal joint and the lower pivotal joint.

16. The all-terrain vehicle as claimed in claim 11 wherein the front wheel includes a wheel hub comprising an angular-contact bearing.

17. The all-terrain vehicle as claimed in claim 11 wherein the front wheel comprises a knuckle pivotally connected to upper and lower A-arms to form the upper and lower pivotal joints, respectively, the knuckle being integrally formed with a spindle for rotationally supporting the front wheel.

18. The all-terrain vehicle as claimed in claim 17 wherein the spindle is made of aluminum and has a diameter greater than 20mm.

* * * * *